(12) United States Patent
Zhao et al.

(10) Patent No.: US 12,657,593 B2
(45) Date of Patent: Jun. 16, 2026

(54) CUSTOMER RECOGNITION SYSTEM

(71) Applicant: Intuit Inc., Mountain View, CA (US)

(72) Inventors: Runhua Zhao, Milpitas, CA (US);
Sonam Sikaria, Mountain View, CA
(US); Jaiyao Liu, Mountain View, CA
(US); Linhong Kang, Sunnyvale, CA
(US); Byron Tang, Mountain View, CA
(US); Bilal Rizvi, Fremont, CA (US)

(73) Assignee: INTUIT INC., Mountain View, CA
(US)

( * ) Notice: Subject to any disclaimer, the term of this
patent is extended or adjusted under 35
U.S.C. 154(b) by 579 days.

(21) Appl. No.: 17/364,859

(22) Filed: Jun. 30, 2021

(65) Prior Publication Data

US 2023/0004989 A1 Jan. 5, 2023

(51) Int. Cl.
*G06N 20/00* (2019.01)
*G06F 18/22* (2023.01)
*G06Q 30/016* (2023.01)

(52) U.S. Cl.
CPC ........... *G06Q 30/016* (2013.01); *G06F 18/22*
(2023.01); *G06N 20/00* (2019.01)

(58) Field of Classification Search
CPC . G06Q 50/01; G06Q 30/0631; G06Q 30/0269
See application file for complete search history.

(56) References Cited

U.S. PATENT DOCUMENTS

| | | | |
|---|---|---|---|
| 8,131,685 B1 | 3/2012 | Gedalius et al. | |
| 9,356,841 B1 * | 5/2016 | Balazs | G06F 40/174 |
| 2008/0250148 A1 * | 10/2008 | Bohannon | G06Q 30/02 |
| | | | 709/229 |
| 2014/0330845 A1 * | 11/2014 | Feldschuh | G06F 16/215 |
| | | | 707/749 |

(Continued)

FOREIGN PATENT DOCUMENTS

WO WO-2022264153 A1 * 12/2022 ............. G06N 20/20

OTHER PUBLICATIONS

M. Wang, Q. Tan, X. Wang and J. Shi, "De-anonymizing Social
Networks User via Profile Similarity," 2018 IEEE Third Interna-
tional Conference on Data Science in Cyberspace (DSC), Guangzhou,
China, 2018, pp. 889-895, doi: 10.1109/DSC.2018.00142 (Year:
2018).*

(Continued)

*Primary Examiner* — Nathan C Uber
*Assistant Examiner* — Maame Ballou
(74) *Attorney, Agent, or Firm* — Lathrop GPM LLP

(57) ABSTRACT

A method implements a customer recognition system. A
request with an identifier of an unidentified user is received.
Sparse data is generated from string information correspond-
ing to the identifier. Preexisting identifiers are filtered to
generate a list of candidate identifiers using the sparse data.
The plurality of preexisting identifiers correspond to a
plurality of preexisting users. A core identifier is selected by
determining a match between the identifier and a preexisting
identifier from the preexisting identifiers using distance (Continued)

information generated using the list of candidate identifiers. The core identifier is matched to the identifier using the match to identify the unidentified user as a preexisting user from the plurality of preexisting users.

7 Claims, 7 Drawing Sheets

(56)                    References Cited

U.S. PATENT DOCUMENTS

| | | | |
|---|---|---|---|
| 2018/0060379 A1* | 3/2018 | Harrod | G06F 21/45 |
| 2021/0097197 A1* | 4/2021 | Kulkarni | G06F 16/215 |

OTHER PUBLICATIONS

Elmagarmid, A. K. et al., "Duplicate Record Detection: A Survey", IEEE Transactions on Knowledge and Data Engineering, vol. 19 No. 1, Jan. 1, 2007 pp. 1-16 (16 pages).
Olga, P. et al., "Entity Matching in Online Social Networks", 2013 International Conference on Social Computing, IEEE, Sep. 8, 2013, pp. 339-344 (6 pages).
Jooyoung, L. et al., "Second-Level Degree-Based Entity Resolution in Online Social Networks", Springer, Social Network Analysis and Mining, vol. 8, No. 1, Mar. 16, 2018, pp. 1-8 (8 pages).
International Search Report in related International Application No. PCT/US2022/022944 mailed Jul. 4, 2022 (4 pages).
Written Opinion of the International Searching Authority in related International Application No. PCT/US2022/022944 mailed Jul. 4, 2022 (9 pages).

* cited by examiner

CLIENT DEVICE A 102

CLIENT APPLICATION 105

CLIENT DEVICE B 108

DEVELOPER APPLICATION 110

SERVER 112

SERVER APPLICATION 115

MACHINE LEARNING MODELS 117

FILTER 118

IDENTIFIER SELECTOR 120

TRAINING APPLICATION 122

REPOSITORY 125

ACCOUNT INFORMATION 127

IDENTIFYING INFORMATION 128

PREEXISTING IDENTIFIERS 130

TRAINING DATA 132

100

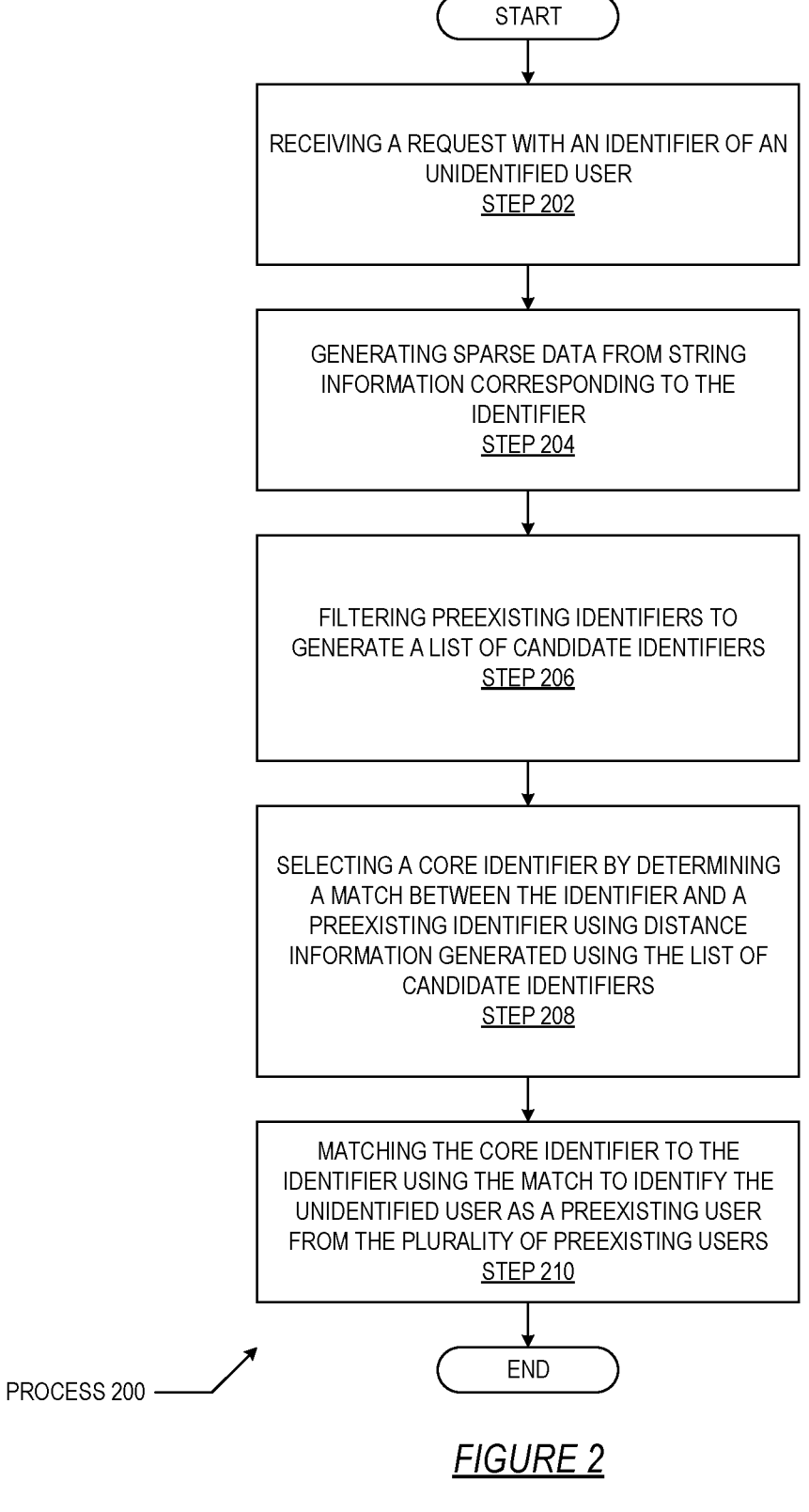

START

RECEIVING A REQUEST WITH AN IDENTIFIER OF AN
UNIDENTIFIED USER
STEP 202

GENERATING SPARSE DATA FROM STRING
INFORMATION CORRESPONDING TO THE
IDENTIFIER
STEP 204

FILTERING PREEXISTING IDENTIFIERS TO
GENERATE A LIST OF CANDIDATE IDENTIFIERS
STEP 206

SELECTING A CORE IDENTIFIER BY DETERMINING
A MATCH BETWEEN THE IDENTIFIER AND A
PREEXISTING IDENTIFIER USING DISTANCE
INFORMATION GENERATED USING THE LIST OF
CANDIDATE IDENTIFIERS
STEP 208

MATCHING THE CORE IDENTIFIER TO THE
IDENTIFIER USING THE MATCH TO IDENTIFY THE
UNIDENTIFIED USER AS A PREEXISTING USER
FROM THE PLURALITY OF PREEXISTING USERS
STEP 210

END

PROCESS 200

*FIGURE 2*

CUSTOMER RECOGNITION SYSTEM

BACKGROUND

Online services maintain accounts for users to verify access to the information and services provided by the online services. Users may be from different groups (different employees of the same organization, different members of the same household, etc.) and may use different devices, email addresses, usernames, etc., to create and access the accounts. A challenge is to recognize the same user or group of users creating and accessing accounts using different, and sometimes conflicting, identifying information and devices.

SUMMARY

In general, in one or more aspects, the disclosure relates to a method that implements a customer recognition system. A request with an identifier is received of an unidentified user. Sparse data is generated from string information corresponding to the identifier. Preexisting identifiers are filtered to generate a list of candidate identifiers using the sparse data. The plurality of preexisting identifiers correspond to a plurality of preexisting users. A core identifier is selected by determining a match between the identifier and a preexisting identifier from the preexisting identifiers using distance information generated using the list of candidate identifiers. The core identifier is matched to the identifier using the match to identify the unidentified user as a preexisting user from the plurality of preexisting users.

In general, in one or more aspects, the disclosure relates to a server that includes sparse models, ordinal models, and an application that executes on the server. A request with an identifier is received of an unidentified user. Sparse data is generated from string information corresponding to the identifier. Preexisting identifiers are filtered to generate a list of candidate identifiers using the sparse models and the sparse data. The plurality of preexisting identifiers correspond to a plurality of preexisting users. A core identifier is selected using the ordinal models by determining a match between the identifier and a preexisting identifier from the preexisting identifiers using distance information generated using the list of candidate identifiers. The core identifier is matched to the identifier using the match to identify the unidentified user as a preexisting user from the plurality of preexisting users.

In general, in one or more aspects, the disclosure relates to a method of training machine learning models. Sparse models are trained, using training data, to convert strings from the training data into sparse matrices with columns corresponding to different n-grams. Ordinal models are trained, using the training data, to generate training probabilities from training distance information extracted from the training data. An identifier is received. Preexisting identifiers are filtered to a list of candidate identifiers using sparse data and the sparse models. The identifier is matched to one of the preexisting identifiers using distance information and the ordinal models.

Other aspects of the invention will be apparent from the following description and the appended claims.

BRIEF DESCRIPTION OF DRAWINGS

FIG. 2 shows a flowchart in accordance with disclosed embodiments.

DETAILED DESCRIPTION

Figure 1A:
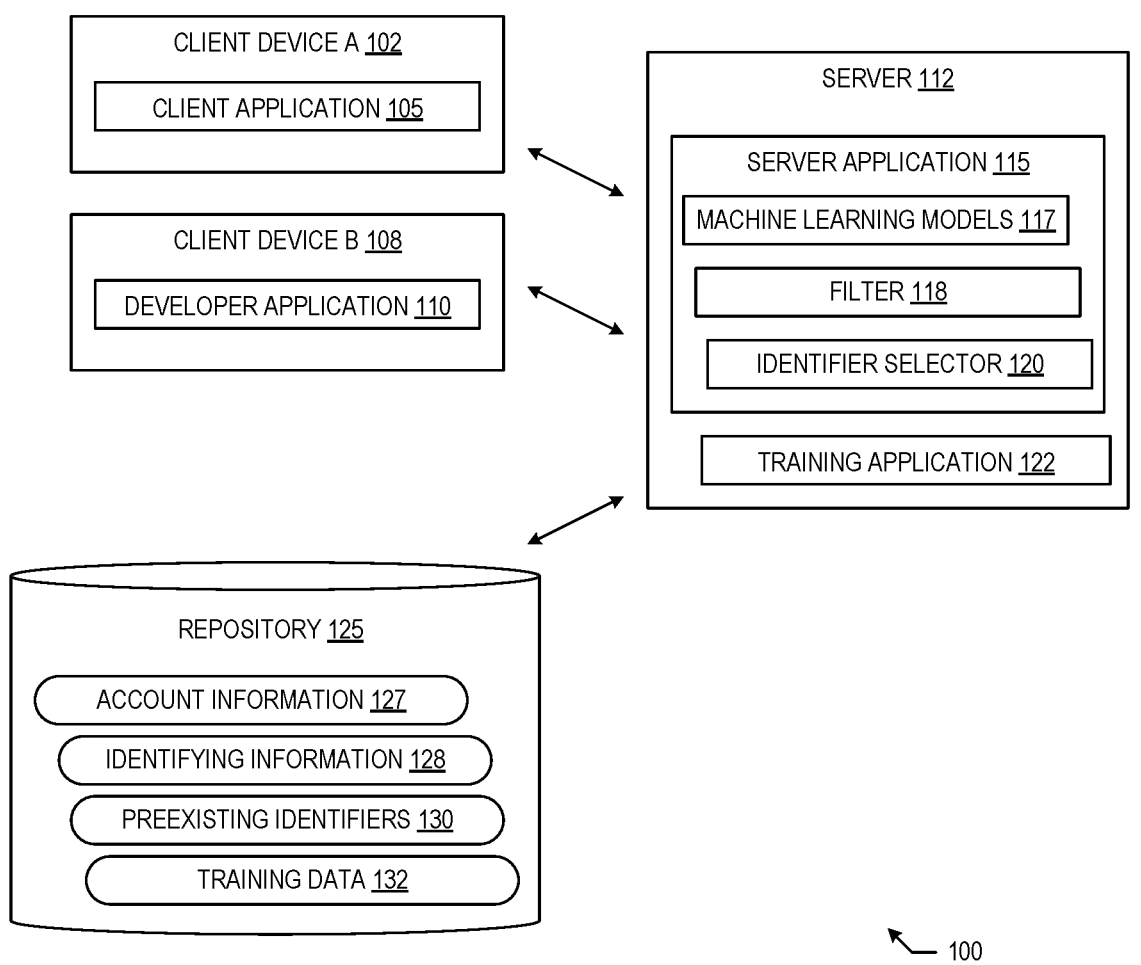
FIG. 1A, FIG. 1B, and FIG. 1C show diagrams of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Existing solutions use id-mapping technologies that rely on "exact" matching among identities to create clusters and universal identities. There is no practice using natural language processing (NLP) to identify distance for people's personal information (e.g., email addresses) and geolocations (e.g., location of internet protocol (IP) addresses). Embodiments of the disclosure combines the NLP as well as id-mapping technologies and has stronger prediction power.

In general, customer recognition systems in accordance with the disclosure recognize the same users or groups of users even when the system is accessed using different devices and conflicting information. For example, a user may create an initial free account and then later attempt to create another free account to continue to access the services of the online provider. The initial account may be generated with identifying information that conflicts with the identifying information used to create the subsequent account. For example, the internet protocol (IP) address may be the same, but the email alias may be different. The system detects the same users or groups of users (e.g., companies) attempting to create new accounts. In response, the provider may link the older and newer accounts together or may direct a user to a previously created account.

To identify an unidentified user as a preexisting user, embodiments of the invention use multiple machine learning models. Sparse data models are used to filter a list of preexisting users down to a list of candidates that might be the same person. Distances between personal information and geolocation information for the unidentified user and the candidates are generated with natural language processing models. Ordinal machine learning models are used to determine whether an unidentified user is one of the candidates of the preexisting users of the system.

Figure 1B:
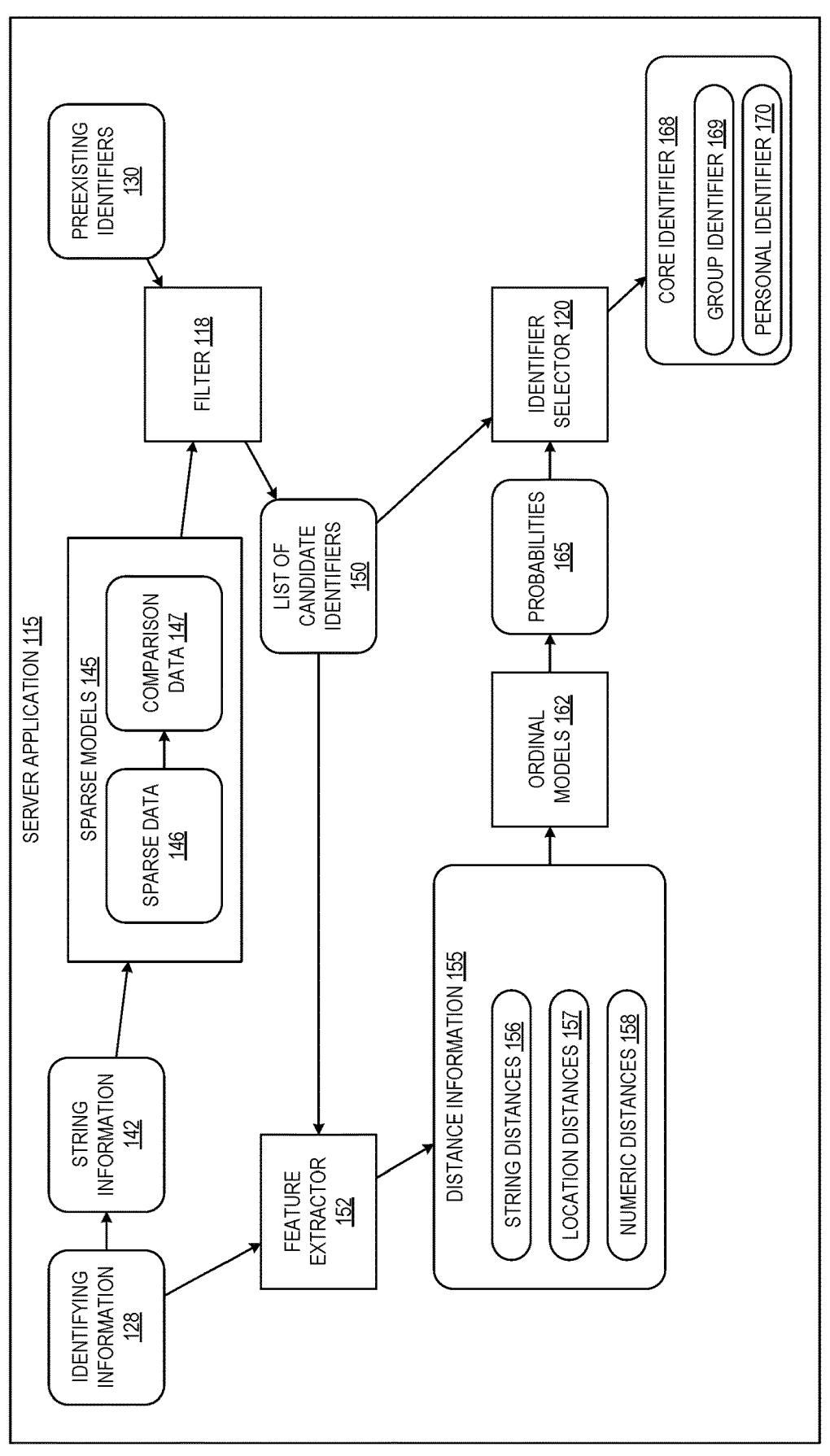
Figure 1C:
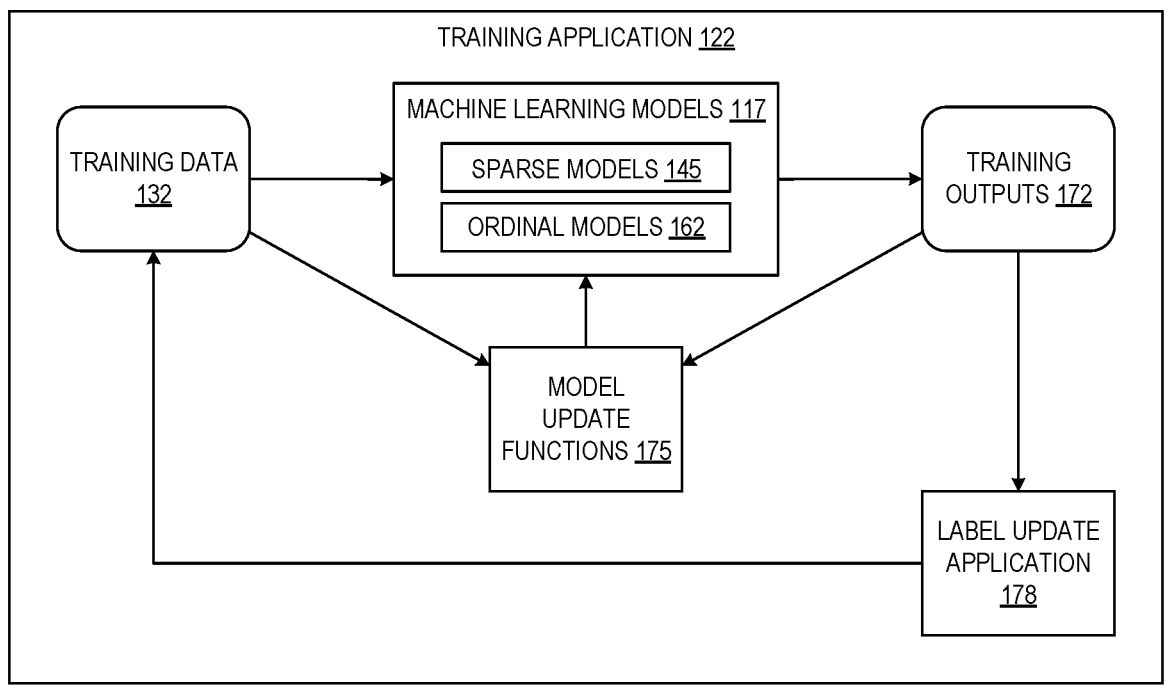

FIGS. 1A, 1B, and 1C show diagrams of embodiments that are in accordance with the disclosure. FIG. 1A shows a diagram of the system (100) that implements a customer recognition system. FIG. 1B shows a diagram of the server application (115). FIG. 1C shows a diagram of the training application (122). The embodiments of FIGS. 1A, 1B, and 1C may be combined and may include or be included within the features and embodiments described in the other figures of the application. The features and elements of FIGS. 1A, 1B, and 1C are, individually and as a combination, improvements to machine learning and user identification technology and computing systems. The various elements, systems, and components shown in FIGS. 1A, 1B, and 1C may be omitted, repeated, combined, and/or altered as shown from FIGS. 1A, 1B, and 1C. Accordingly, the scope of the present disclosure should not be considered limited to the specific arrangements shown in FIGS. 1A, 1B, and 1C.

Turning to FIG. 1A, the system (100) detects users and groups of users that match with preexisting users and groups of users. The system (100) includes the client device A (102), the client device B (108), the server (112), and the repository (125). While depicted using a client server architecture, embodiments of the system (100) may be implemented on a single computing system.

Figure 5A:
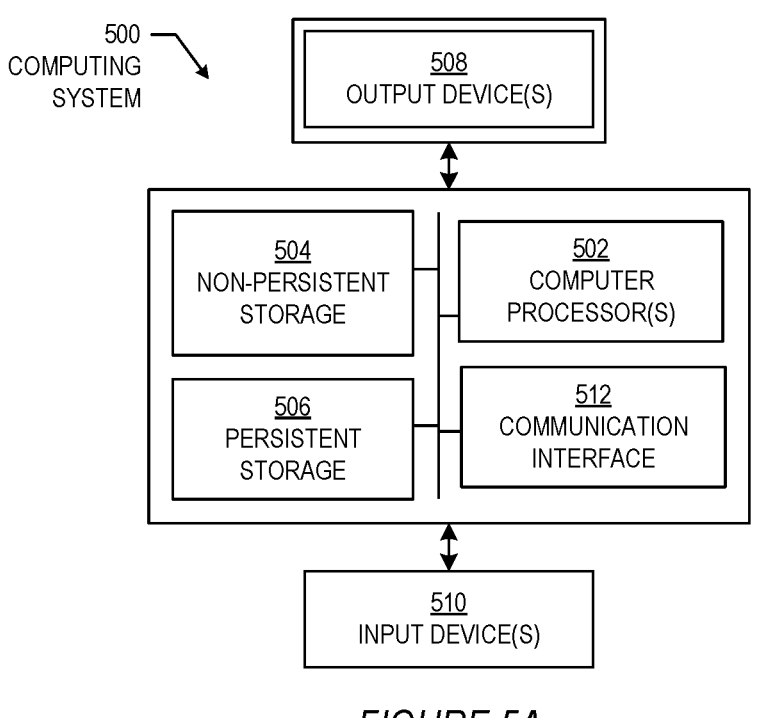
FIG. 5A and FIG. 5B show computing systems in accordance with disclosed embodiments.

The client devices A (102) and B (108) are computing systems (further described in FIG. 5A). For example, the client devices A (102) and B (108) may be desktop computers, mobile devices, laptop computers, tablet computers, etc. The client devices A (102) and B (108) respectively include the client application (105) and the developer application (110).

The client application (105) and the developer application (110) are programs running on the client devices A (102) and B (108). The client application (105) is operated by user to access the server application (115) to generate and access accounts for online services that may be hosted by the server (112). The developer application (110) is used by a developer to operate the training application (122) to train the machine learning models of the system (100). The client application (105) and the developer application (110) may be native applications or may be browser applications that send and receive messages to and from the applications hosted by the server (112).

The server (112) is a computing system (further described in FIG. 5A). The server (112) may include multiple physical and virtual computing systems that form part of a cloud computing environment. In one embodiment, execution of the programs and applications of server (112) is distributed to multiple physical and virtual computing systems in the cloud computing environment. In one embodiment, the server (112) includes the server application (115) and the training application (122).

The server application (115) is a collection of programs that may execute on the server (112). In one embodiment, the server application hosts a website accessed by the client application (105). The server application (115) includes the machine learning models (117), the filter (118), and the identifier selector (120).

The machine learning models (117) are programs running as part of the server application (115). The machine learning models (117) may include the sparse models (145) of FIG. 1B and the ordinal models (162) of FIG. 1B.

The filter (118) is a program running as part of the server application (115). The filter (118) filters the preexisting identifiers (130) using the identifying information (128) to identify a list of users that match to the user of the client device A (102).

The identifier selector (120) is a program running as part of the server application (115). The identifier selector (120) selects identifiers for the users of the system (100).

The training application (122) is a collection of programs that may execute on the server (112). The training application (122) trains the machine learning models used by the system (100) and may be controlled by the developer application (110).

The repository (125) is a computing system that may include multiple computing devices in accordance with the computing system (500) and the nodes (522) and (524) described below in FIGS. 5A and 5B. The repository (125) may be hosted by a cloud services provider that also hosts the server (112). The cloud services provider may provide hosting, virtualization, and data storage services as well as other cloud services and to operate and control the data, programs, and applications that store and retrieve data from the repository (125). The data in the repository (125) includes the account information (127), the identifying information (128), the preexisting identifiers (130), and the training data (132).

The account information (127) includes information for the accounts of the users of the system. The account information (127) may identify the services to which a user has access. The account information (127) may also include usernames, email addresses, physical addresses, access logs, user device information, etc., for the users of the system (100).

The identifying information (128) includes information that identifies a user of the system (100). The identifying information (128) include the information about a user when the user attempts to access the system (100). For example, the identifying information (128) may include the names of users, email aliases (the portion of an email without the domain name and before the "@"), physical address information (number, street name, city, state, etc.), location information (geolocation coordinates, internet protocol (IP) address location mapping, etc.), and digital profile information (e.g., device identifier, operating system identifier, access history, etc.).

The preexisting identifiers (130) are identifiers for preexisting users that have already accessed the system (100) and may already have an account. In one embodiment, the preexisting identifiers (130) are core identifiers. Core identifiers are identifiers that are assigned to the users of the system to uniquely identify the users of the system. Users that have created an account with the system may be referred to as preexisting users and the core identifiers of the preexisting users may be referred to as preexisting identifiers. Additionally, when an unidentified user attempts to access the system, the system identifies a subset of the preexisting users, referred to as candidate users, that may be the same person as the unidentified user. The core identifiers for the candidate users may be referred to as candidate identifiers. Each core identifier has a group identifier and a personal identifier. The group identifier is the same for a group of related users (e.g., same organization or household). The personal identifier is unique to a person within a group.

The training data (132) is the data used to train the machine learning models (117) of the system (100). The training data may include training inputs and labels.

Turning to FIG. 1B, the server application selects the core identifier (168) based on the identifying information (128). The identifying information (128) is received by the server application (115) from the client application (105) (of FIG. 1A) and corresponds to a user (referred to as an unidentified user) accessing the system (100) (of FIG. 1A).

The string information (142) is extracted from the identifying information (128). The string information (142) may include multiple different types of string data. In one embodiment, the string information (142) includes the name of the user (e.g., "Alan Schaefer"), an email alias (e.g., "dutch" from the email address "dutch@predator.com"), and a physical address (e.g., a street address).

The sparse models (145) are natural language processing models that generate the sparse data (146) from the string information (142). The sparse models (145) are a subset of the machine learning models (117) (of FIG. 1A). Each different type of string data (name, alias, address, etc.) may use a different sparse model from the sparse models (145). In one embodiment, the sparse models (145) are n-gram models that identify the n-grams in the different types of string data from the string information (142). N-grams are combinations of characters in a string. For example, the string "dutch" includes the trigrams (an n-gram with three characters) "dut", "utc", and "tch" and includes the 4-grams "dutc" and "utch".

In one embodiment, the sparse data (146) includes sparse matrices that identify the n-grams in the string information (142). The sparse data (146) includes sparse matrices generated from the identifying information (128) for a user accessing the system (100) (of FIG. 1A). The sparse data (146) also includes sparse matrices for the same type of string data for the preexisting users that already have accounts on the system (100). For example, sparse data (146) may include sparse matrices identifying the n-grams for the name, email alias, and physical address for the user accessing the system (100) and for the preexisting users with established accounts.

The sparse models (145) generate the comparison data (147) from the sparse data (146). For example, the sparse models (145) may multiply the sparse matrices generated from the identifying information (128) by the sparse matrices generated from the account information of preexisting users.

The comparison data (147) includes a data structure that identifies the preexisting users with string data that is similar to the string information (142) for the user accessing the system. In one embodiment, the different types of string data are concatenated into a single data structure for the comparison data.

The preexisting identifiers (130) are identifiers for the preexisting users of the system (100) (of FIG. 1A). The preexisting identifiers (130) is used to identify the account information (127) (of FIG. 1A) that corresponds to the preexisting users.

The filter (118) identifies the list of candidate identifiers (150) from the comparison data (147) and the preexisting identifiers (130). In one embodiment, the filter (118) identifies a threshold number of best matches for each type of string data from the string information (142). For example, the filter (118) may select the five names that best match the name from the identifying information (128), identify the five preexisting identifiers from the preexisting identifiers (130) that correspond with those names, and include those five preexisting identifiers as candidate identifiers in the list of candidate identifiers (150). The same may be done for the email alias and physical address, which may have different thresholds (e.g., best 4 matches, best 3 matches, etc.).

The list of candidate identifiers (150) is a subset of the preexisting identifiers (130). The list of candidate identifiers (150) identifies the preexisting users (also referred to as candidate users) of the system that may be the same person or in the same group as the user accessing the system with the identifying information (128).

The feature extractor (152) uses the identifying information (128) and the list of candidate identifiers (150) to generate the distance information (155). The feature extractor (152) extracts string information, location information, and numeric information from the identifying information (128) and from the account information (127) (of FIG. 1A) that corresponds to the identifiers from the list of candidate identifiers (150).

The distance information (155) identifies the distances between data from the identifying information (128) for the unidentified user and data for the candidate users corresponding to the list of candidate identifiers (150). Distances are calculated for each pairing of the unidentified user with a candidate user. The distance information (155) includes the string distances (156), the location distances (157), and the numeric distances (158).

The string distances (156) are the distances between string data for the unidentified user (from the identifying information (128)) and string data for the candidate users (identified with the list of candidate identifiers). For example, with the string data for a name, distances are calculated between the name of the unidentified user and the names of the candidate users. The string distances (156) may include distances for names, email aliases, physical addresses, etc. Multiple distances may be calculated for each type of string.

Multiple phonetic algorithms (soundex, NYSIIS (New York State Information and Intelligence Systems), double metaphone, etc.) may be used to calculate the distances. The phonetic representation of a string replaces the original groups of characters from the original string with phonetic groups of characters that identify the sound made when pronouncing the original groups of characters. The phonetic representations use the same group of characters for different groups of characters with the same sound. For example, "to", "two", and "too", which each sound the same, may be represented by "to" in a phonetic string.

The distances may be calculated using the Levenshtein distance algorithm, which identifies the minimum number of single-character edits required to change one string into the other. As applied here, for the name of a user, the Levenshtein distance may be calculated for the original string data, for the soundex representation, for the NYSIIS representation, and the double metaphone representation.

The location distances (157) are the distances between the location of the user and the locations of the candidate users. The location distances (157) may include distances between the IP address locations, physical address locations, satellite positioning locations, etc., of the unidentified and candidate users. The IP addresses of the unidentified and candidate users may be mapped to physical locations, which may be mapped to longitude and latitude or satellite positioning coordinates.

The numeric distances (158) are the distances between the information from the digital profiles of the unidentified and candidate users. The distances may be binary. For example, if the unidentified user and a candidate user each use the same operating system, the "distance" may be "1" (and "0" when different).

The ordinal models (162) generate the probabilities (165) using the distance information (155). The ordinal models (162) are a subset of the machine learning models (117) (of FIG. 1A). The ordinal models (162) may use multiple different algorithms, including decision trees, support vector machines, random forests, logistic regression, etc.

In one embodiment, the probabilities (165) are a set of ordinal probabilities with the categories of "same person", "same group", "not sure", and "not the same". The outputs from each of the ordinal models (162) may be combined to form the probabilities (165). In one embodiment, the outputs are averaged to form a data structure as a vector of probabilities with four elements, one for each of the categories "same person", "same group", "not sure", and "not the same". A vector of probabilities is generated for each pairing of the unidentified user with a candidate user.

The identifier selector (120) generates the core identifier (168) using the list of candidate identifiers (150) and the probabilities (165). When the probabilities (165) indicate that the unidentified user (corresponding to the identifying information (128)) is the same as one of the candidate users (corresponding to a candidate identifier from the list of candidate identifiers (150)), the identifier selector (120) may select the core identifier (168) to be the same as the identifier for the candidate user. When the probabilities (165) indicate that the unidentified user is part of the same group as one of the candidate users, the identifier selector (120) may select the core identifier (168) to have the group identifier (169) be the same as the group identifier of the matching candidate user. When the probabilities (165) indicate that the unidentified user is not the same user and not the same group, the identifier selector (120) may select the core identifier (168) to have the group identifier (169) that is different from the group identifiers of the preexisting users of the system (100).

The core identifier (168) is assigned to the unidentified user by the identifier selector (120). The core identifier (168) includes the group identifier (169) and the personal identifier (170). The group identifier (169) identifies a group of users that are from the same entity or household. The personal identifier (170) identifies one user within a group of users.

Turning to FIG. 1C, the training application (122) trains the machine learning models (117). The machine learning models (117) include the sparse models (145) and the ordinal models (162). The training application (122) may train each of the models individually.

The training data (132) for the sparse models (145) includes string information for the preexisting users of the system. The training data (132) for the ordinal models (162) includes distance information generated from the account information of preexisting users. The training data (132) for the ordinal models (162) also includes labels to identify if two users are the same user, are in the same group, or are not the same.

The machine learning models (117) generate the training outputs (172) in response to the training data (132). Training output for the sparse models (145) includes the sparse matrices for the string data of preexisting users. Training output for the ordinal models (162) includes sets of ordinal probabilities.

The model update functions (175) update the machine learning models (117) based on the training outputs (172) and the training data (132). The sparse models (145) may be updated to use different types of n-grams (e.g., 3-gram and 4-gram models). The ordinal models (162) may be updated using gradient descent to generate more accurate outputs based on the error between the output from the ordinal models (162) and the labels for the inputs to the ordinal models (162).

The label update application (178) updates the training data (132) based on the training outputs (172). The label update application (178) may identify input data that was incorrectly identified or identified as the category labeled "not sure" and present the input data to a developer using the developer application (110) (of FIG. 1A). The developer may identify the correct label for the input data, which is stored to the training data (132).

When training the ordinal models (162), different models may be used during different phases of training. In a first phase, a decision tree model may be used to generate an initial set of labels. In subsequent phases, different models, including logistic regression, support vector machine, and random forest models may be used after the initial set of labels are generated using the initial model (e.g., the decision tree).

FIG. 2 shows flowchart of processes in accordance with the disclosure. FIG. 2 is a flowchart of a method of a customer recognition system. The embodiments of FIG. 2 may be combined and may include or be included within the features and embodiments described in the other figures of the application. The features of FIG. 2 are, individually and as an ordered combination, improvements to machine learning and user identification technology and computing systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven. By way of an example, determination steps may not have a processor process an instruction unless an interrupt is received to signify that condition exists. As another example, determinations may be performed by performing a test, such as checking a data value to test whether the value is consistent with the tested condition.

Turning to FIG. 2, the process (200) assigns core identifiers to unidentified users. The process (200) may execute as part of a server application on a server.

At Step 202, a request with an identifier of an unidentified user is received. The request may be from a client application running on a client device. The client application may be operated by an unidentified user attempting to access the system. The request may also include identifying information linked to the unidentified user. The identifying information may include a name of the user, email address, location information, digital profile information, etc.

At Step 204, sparse data is generated from string information corresponding to the identifier. The string information is extracted from the identifying information for the unidentified user. The sparse data includes sparse matrices generated with sparse machine learning models (i.e., sparse models) from the identifying information (for the unidentified user) and from the account information (for the preexisting users).

At Step 206, a plurality of preexisting identifiers is filtered to generate a list of candidate identifiers using sparse data generated from string information corresponding to the identifier. The plurality of preexisting identifiers correspond to a plurality of preexisting users. The preexisting identifiers are core identifiers that identify the preexisting users of the system and link to the account information of the preexisting users. The candidate identifiers are core identifiers that identify candidate users that may match with the unidentified user.

In one embodiment, the sparse data is generated by converting the string information to sparse matrices. The string information may include multiple types of string data (e.g., name, email alias, physical address, etc.), a sparse matrix may be generated for each type of string data, and the different sparse matrices may be combined, e.g., by being concatenated together.

In one embodiment, the sparse matrices are generated using a plurality of n-gram machine learning models. For example, 3-gram (character sequences with three characters) and 4-gram (character sequences with four characters) models may be used to generate the columns of the sparse matrices. Each column of a sparse matrix may be linked to a specific n-gram (e.g. "joh", "bet", "anne", etc.) to identify if the input includes the specific n-gram. For example, the input string "john" includes the n-gram "joh" but not the n-grams "bet" or "anne" so the column for "joh" may be set to "1" and the columns for "bet" and "anne" may be set to "0".

In one embodiment, multiple sparse models are trained, using training data, to convert strings (from the training data) into sparse matrices with columns corresponding n-grams. The sparse models are trained to identify and use a selected set of n-grams. In one embodiment, a sparse model may identify a threshold number of 3-grams and 4-grams (e.g., about 10,000) with the lowest frequency from the training data. Different sparse models may be trained for each type of string data (e.g., name, alias, address, etc.).

In one embodiment, the preexisting identifiers are filtered by comparing sparse matrices and identifying the list of candidate identifiers. A sparse matrix for the unidentified user (i.e., from the sparse data that corresponds to the identifier) is compared to sparse matrices for the preexisting users (i.e., from the sparse data that corresponds to the preexisting identifiers) to generate comparison data. The comparison data and a threshold are used to identify the list of candidates. In one embodiment, the comparison data is a matrix generated from multiplying the sparse matrix for the candidate user by a sparse matrix for the pre-existing users. The comparison data is sorted to identify the preexisting users with information that most closely matches the identifying information of the unidentified user. The preexisting users that are better matches have more n-grams in common with the unidentified user.

At Step 208, a core identifier is selected by determining a match between the identifier and one of the preexisting identifiers using distance information generated using the list of candidate identifiers. The distance information is generated for each pairing of the unidentified user with a candidate user. The distance information identifies the distance between information about the unidentified user with information about a preexisting user. For example, the names of the users may be used with the distance identified as the Levenshtein distance between the names of the users.

In one embodiment, the distance information includes string distances between strings from the string information, location distances between physical locations identified from the identifying information, and numeric distances between digital profile values from the identifying information. The string distances may include the Levenshtein distance between strings for the actual names of the users and the Levenshtein distance between strings for phonetic representations of the names of the users. The location distances may also include the distance between the locations identified from the street addresses of the users, locations identified from the IP addresses of the users, locations identified from satellite positioning coordinates of the users. The numeric distances may be based on the differences (i.e., distance) between the digital profiles of the unidentified user and candidate users and use binary values to identify that two users are either the same or different.

In one embodiment, the core identifier is selected by generating, from the distance information, sets of probabilities corresponding to the candidate identifiers from the list of candidate identifiers. The distance information for two users (i.e., the unidentified user and one of the candidate users) is input too multiple ordinal machine learning models. Each of the models outputs a set of ordinal probabilities. The probabilities from the different models may be combined by being averaged together to form a final set of probabilities. In one embodiment, each of the sets of probabilities includes a probability for one of the categories of "same person", "same group", "not sure", and "not the same".

A match between the unidentified user and one of the candidate users is then based on the final set of probabilities. For example, when the probability for "same person" category is the highest of the set of probabilities, the unidentified user may be identified as a match with the corresponding candidate user. When the probability for the "same group" category is the highest of the set of probabilities, the users may be different, but are identified as being part of the same organization or household. When the probability for the "not sure" or "not the same" categories have the highest probability of the set of probabilities, the users do not match.

In one embodiment, multiple ordinal models are trained using training data to generate training probabilities from training distance information extracted from the training data. The training probabilities are sets of probabilities generated during training. The training distance information is distance information generated, during training, from the account information for the preexisting users. Multiple different models may be trained for each type of distance information, including decision trees, support vector machines, random forests, logistic regression, etc.

At Step 210, a core identifier is matched to the identifier of the unidentified user using the match to identify the unidentified user as a preexisting user from preexisting users of the system. The core identifier matched to the unidentified user may include a group identifier and a personal identifier that are the same as the group identifiers and personal identifiers for the candidate users.

When the match indicates that the unidentified user is one of the candidate users, then the core identifier assigned to the unidentified user is the same as the core identifier assigned to the candidate user. I.e., the unidentified user and the candidate user have the same group identifiers and personal identifiers.

When the match indicates that the unidentified user is part of the same group as a candidate user, the core identifier assigned to the unidentified user includes the group identifier from the core identifier of the candidate user. A new personal identifier, for the group identified with the group identifier, is generated to distinguish the unidentified user from the other preexisting users that have the same group identifier.

When the match indicates that the unidentified user is not the same person and not in the same group, the core identifier assigned to the unidentified user includes a new group identifier. The personal identifier, of the core identifier assigned to the unidentified user, may be used by other preexisting users that are in different groups and have different group identifiers.

In one embodiment, the request is received as a registration request to register an account for the unidentified user. The registration request may be denied using matches between the unidentified user and the candidate users. For example, when the unidentified user matches as either the same person or the same group as one of the candidate users, the registration request may be denied to prevent the unidentified user from creating a new account.

In one embodiment, account information corresponding to the core identifier is presented in response to the request. For example, the request may be a registration request that is denied and the system may send a response describing the denial of the request. When the request is denied, the user may be given the option to log into the preexisting account.

In one embodiment, when the unidentified user matches with a candidate user, the unidentified user may be allowed to link the new account to the preexisting account.

Figure 3:
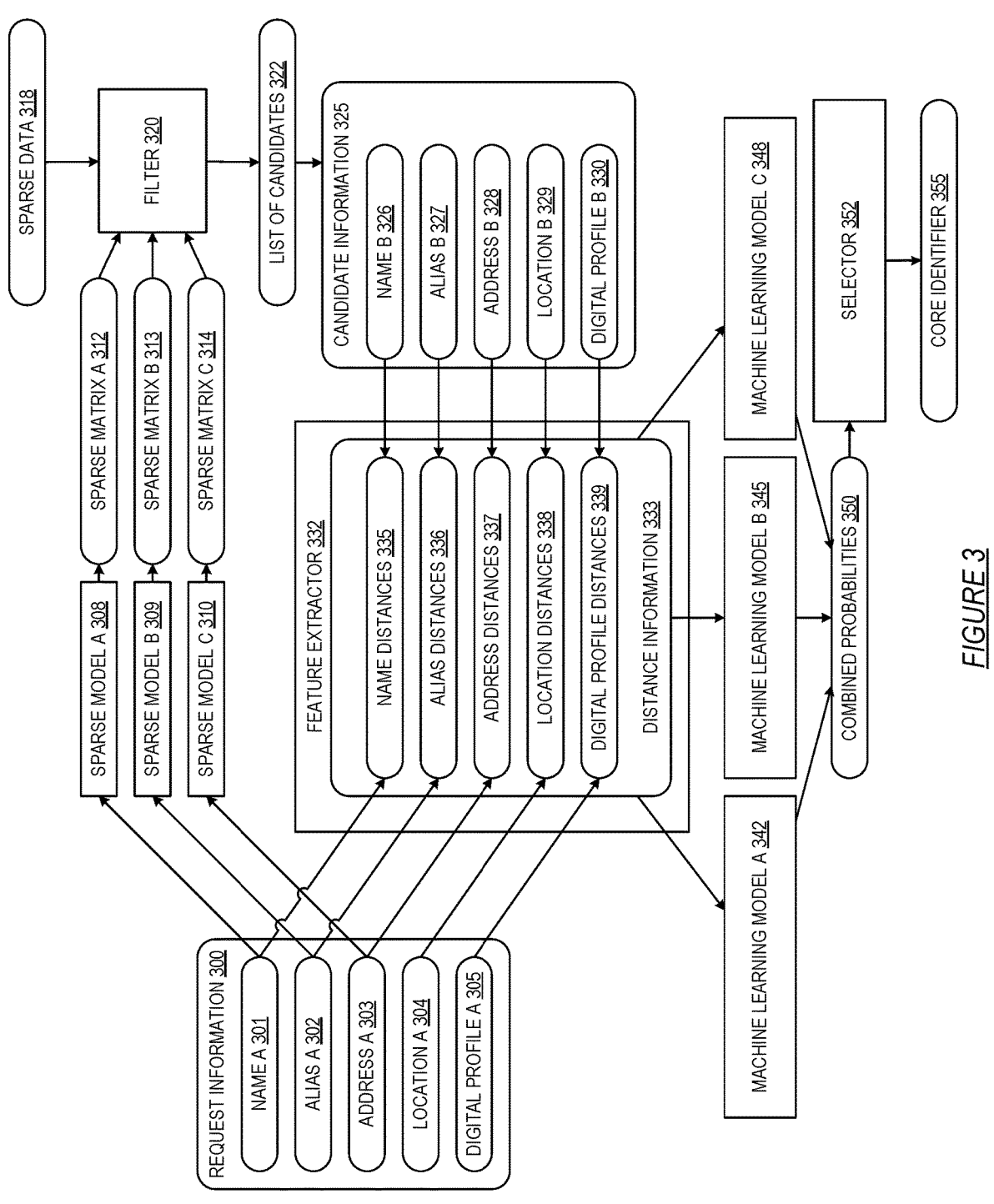
FIG. 3 and FIG. 4 show examples in accordance with disclosed embodiments.
Figure 4:
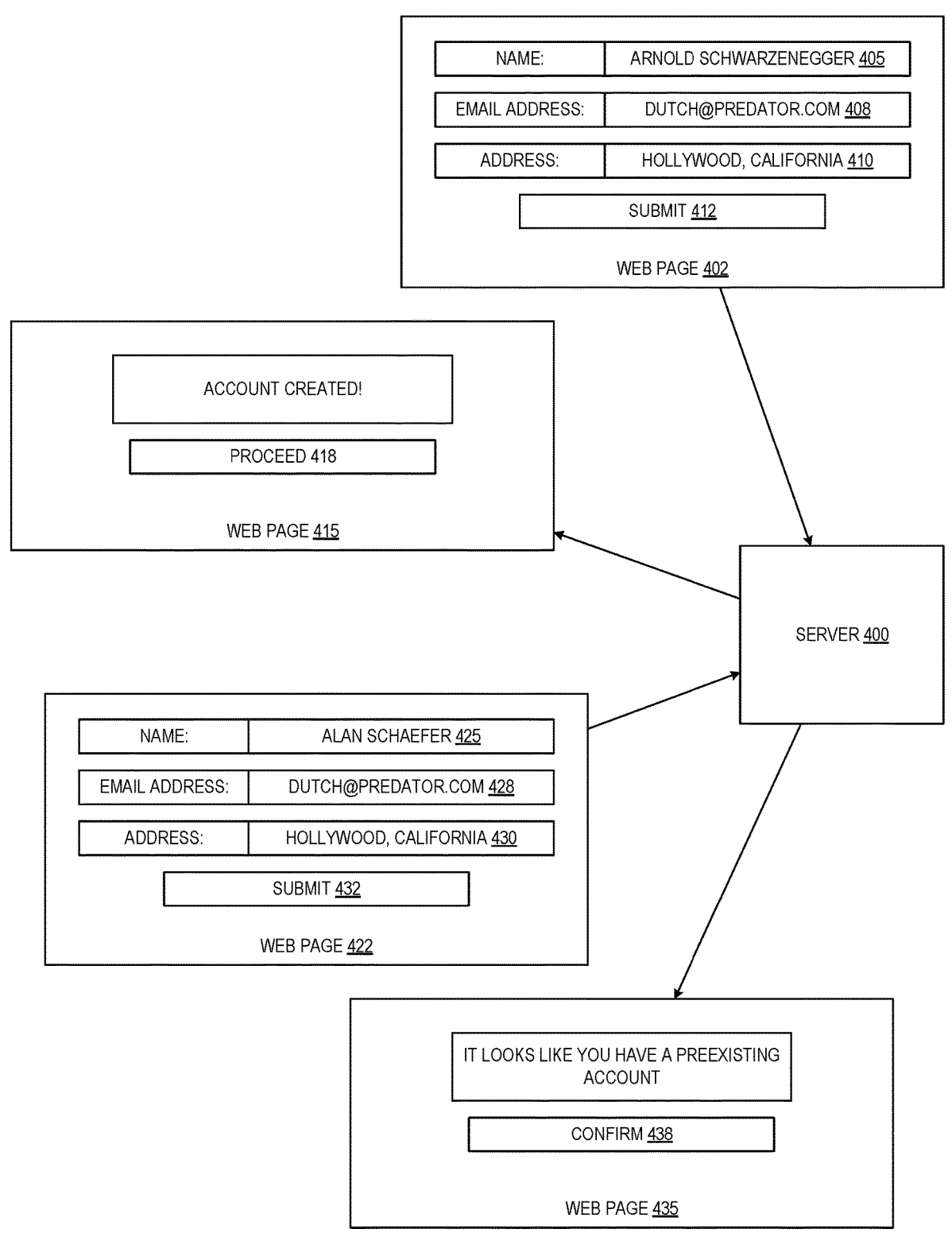

FIGS. 3 and 4 show examples of systems and sequences that use private information with a shared single source of truth. FIG. 3 shows an example of determining the core identifier (355) using identifying information from the request information (300). FIG. 4 shows an example of a user attempting to create multiple accounts. The embodiments shown in FIGS. 3 and 4 may be combined and may include or be included within the features and embodiments described in the other figures of the application. The features and elements of FIGS. 3 and 4 are, individually and as a combination, improvements to machine learning and user identification technology and computing systems. The various features, elements, widgets, components, and interfaces shown in FIGS. 3 and 4 may be omitted, repeated, combined, and/or altered as shown. Accordingly, the scope of the present disclosure should not be considered limited to the specific arrangements shown in FIGS. 3 and 4.

Turning to FIG. 3, the core identifier (355) is assigned to an unidentified user based on the request information (300). The unidentified user may be attempting to access a computing system by issuing an access request that is linked to the request information (300).

From the request information (300), the name A (301), the alias A (302), and the address A (303) are input to the sparse models A (308), B (309), and C (310) to generate the sparse matrices A (312), B (313), and C (314). The sparse matrices A (312), B (313), and C (314) and the sparse data (318) are input to the filter (320). The sparse data (318) includes sparse matrices for the names, aliases, and addresses of the preexisting users of the system.

The filter (320) generates the list of candidates (322) using the sparse matrices A (312), B (313), and C (314) and the sparse data (318). The filter (320) identifies the preexisting users that have name, alias, and address information that is similar to the name A (301), alias A (302), and address A (303) of the request information (300) for the unidentified user. The preexisting users with the highest similarity (referred to as candidate users) are identified in the list of candidates (322).

After identifying the list of candidates (322), the feature extractor (332) extracts features (the distance information (333)) from the request information (300) and the account information for the candidate users. Sets of distance information are generated for each pairing of the unidentified user and one of the candidate users from the list of candidates (322). The distance information (333) corresponds to the request information (300) (for the unidentified user) paired with the candidate information (325) (for one of the candidate users). The candidate information (325) includes the name B (326), the alias B (327), the address B (328), the location B (329), and the digital profile B (330) for one of the candidate users identified in the list of candidates (322).

The distance information (333) includes multiple distances between data from the request information (300) and the candidate information (325). The distance information (333) includes the name distances (335), the alias distances (336), the address distances (337), the location distances (338), and the digital profile distances (339).

The name distances (335) are the distances between the names A (301) and B (326). The names A (301) and B (326) are the names of the unidentified user and the candidate user. The names A (301) and B (326) may be converted to phonetic representations. In one embodiment, the name distances (335) includes the Levenshtein distances names A (301) and B (326) and one or more phonetic versions of the names A (301) and B (326).

The alias distances (336) are the distances between the aliases A (302) and B (327). The aliases A (302) and B (327) are the aliases extracted from the email addresses of the unidentified user and the candidate user. The alias distances (336) include the Levenshtein distances between the aliases A (302) and B (327) and one or more phonetic versions of the aliases A (302) and B (327).

The address distances (337) are the distances between the addresses A (303) and B (328). The addresses A (303) and B (328) are the physical (e.g., street) addresses for the unidentified user and the candidate user. The address distances (337) include the Levenshtein distances between the aliases A (302) and B (327) and one or more phonetic versions of the aliases A (302) and B (327). In one embodiment, the address distances (337) does not include distances using phonetic versions of the aliases A (302) and B (327).

The location distances (338) are the distances between the locations A (304) and B (329). The locations A (304) and B (329) may include multiple types of location data. The location data may be generated from IP addresses for the unidentified user in the candidate user. The location data may also include coordinates generated by a satellite positioning receiver. The location distances (338) include distances between the unidentified user and the candidate user for each type of location data. The distances is may identify the longitudinal and latitudinal distances between the unidentified user and the candidate user.

The digital profile distances (339) are the distances between the digital profiles A (305) and B (330). The digital profiles A (305) and B (330) include information about the unidentified user and the candidate user. For example, the digital profiles may include identifiers for the type of operating system, the type of client device, the type of client application, etc. A digital profile may also include the browser history of a user. The digital profile distances (339) include binary values that identify if the information from the digital profiles A (305) and B (330) are the same.

The distance information (333) is input to each of the machine learning models A (342), B (345), and C (348). Each of the machine learning models A (342), B (345), and C (348) generate a set of probabilities that are combined to form the combined probabilities (350). The sets of probabilities include probabilities for the categories of "same person", "same group", "not sure", and "not the same". In one embodiment, the output from the machine learning models A (342), B (345), and C (348) are averaged to form the combined probabilities (350).

The combined probabilities (350) are input to the selector (352). The selector (352) generates the core identifier (355) using the combined probabilities (350). The selector (352) receives a set of combined probabilities for each of the candidate users identified in the list of candidates (322). When a candidate user matches to the unidentified user as the same person, the core identifier (355) assigned to the unidentified user is the same as the core identifier for the candidate users. When a candidate user matches to the unidentified user as being in the same group, the core identifier (355) for the unidentified user includes the same group identifier as for the candidate user. When the candidate users do not match the unidentified user, the core identifier (355) includes a group identifier that is different from the group identifiers for the preexisting users of the system.

Turning to FIG. 4, a first user successfully creates an initial account with the server (400). A second user attempts to create a new account later, which is detected by the server (400) as being the same person as the first user. The user interacts with a client device to interact with the web pages (402), (415), (422), and (435) from the server (400).

The web page (402), from the server (400), is used to submit information for a new account. The first user inputs identifying information including the name (405), the email address (408), and the address (410). Upon selection of the submit button (412), the identifying information is submitted to the server (400).

The server (400) processes the identifying information to determine if the first user (treated as an unidentified user) is a preexisting user. As described in FIG. 3, the server (400) runs a process to identify a list of candidates from sparse data generated from string information. With the list of candidates, the server (400) generates distance information that is input to machine learning models to identify a match between the unidentified first user and one of the candidate users.

For the first user, no match is found, the first user is assigned a core identifier with a new group identifier, and the web page (415) is presented by the server (400). Selection of the button (418) proceeds with allowing the first user to access the system using the newly created account.

Later, the web page (422) is presented by the server (400) to a second user (who is unidentified by the system) attempting to create another new account. The second user submits a second set of identifying information including the name (425), the email (428), and the address (430). Upon selection of the submit button (432), the second set of identifying information is submitted to the server (400).

The server (400) processes the second set of identifying information. The list of candidates identifies the first user as a preexisting user based on the similarities in the email aliases ("dutch") of the email addresses (408) and (428) and the similarities in the address ("Hollywood, California"). Distance information is generated that indicates the same IP address at the same location is also being used. The distance information is input to the machine learning models that identify the second user as being the same person as the first user.

For the second user, after being matched to the first user, the same core identifier of the first user is assigned to the second user and the web page (435) is presented. Selection of the confirm button (438) allows the second user to confirm that the preexisting account is correct and access the system using the previously created account.

Embodiments of the invention may be implemented on a computing system. Any combination of a mobile, a desktop, a server, a router, a switch, an embedded device, or other types of hardware may be used. For example, as shown in FIG. 5A, the computing system (500) may include one or more computer processor(s) (502), non-persistent storage (504) (e.g., volatile memory, such as a random access memory (RAM), cache memory), persistent storage (506) (e.g., a hard disk, an optical drive such as a compact disk (CD) drive or a digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) (502) may be one or more cores or micro-cores of a processor. The computing system (500)

may also include one or more input device(s) (510), such as a touchscreen, a keyboard, a mouse, a microphone, a touchpad, an electronic pen, or any other type of input device.

The communication interface (512) may include an integrated circuit for connecting the computing system (500) to a network (not shown) (e.g., a local area network (LAN), a wide area network (WAN) such as the Internet, a mobile network, or any other type of network) and/or to another device, such as another computing device.

Further, the computing system (500) may include one or more output device(s) (508), such as a screen (e.g., a liquid crystal display (LCD), a plasma display, a touchscreen, a cathode ray tube (CRT) monitor, a projector, or other display device), a printer, an external storage, or any other output device. One or more of the output device(s) (508) may be the same or different from the input device(s) (510). The input and output device(s) (510 and (508)) may be locally or remotely connected to the computer processor(s) (502), non-persistent storage (504), and persistent storage (506). Many different types of computing systems exist, and the aforementioned input and output device(s) (510 and (508)) may take other forms.

Software instructions in the form of computer readable program code to perform embodiments of the invention may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system (500) shown in FIG. 5A, or a group of nodes combined may correspond to the computing system (500) shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Figure 5B:
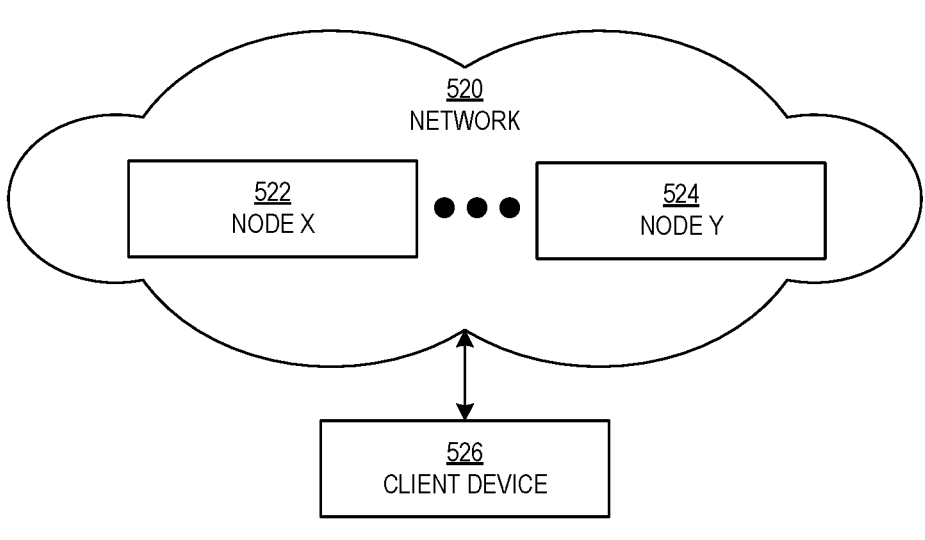

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system (500) shown in FIG. 5A. Further, the client device (526) may include and/or perform all or a portion of one or more embodiments of the invention.

The computing system (500) or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (500) in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system (500) of FIG. 5A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (500) in FIG. 5A may implement and/or be connected to a data repository. For example, one type of data repository is a database. A database is a collection of information configured for ease of data retrieval, modification, re-organization, and deletion. A Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (500) of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (500) of FIG. 5A and the nodes (e.g., node X (522), node Y (524)) and/or client device (526) in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of using a combination of machine learning models for identifying, as a matched preexisting user, an unidentified user of a preexisting online account when the unidentified user is attempting to access a second online account using different or conflicting identifying information or devices, the method comprising:

receiving a request with an identifier of the unidentified user, wherein the request is a registration request to register the second online account using the different or conflicting identifying information or devices;

generating, by a computer processor and storing on a physical storage device, sparse data from string information corresponding to the identifier of the unidentified user, wherein the string information comprises different types of string data, wherein generating the sparse data further comprises:

inputting the string information to a sparse model comprising an N-gram machine learning model, generating, by the sparse model, a sparse matrix that identifies N-grams in the string information, generating, by the sparse model, comparison data from the sparse matrix, wherein the comparison data includes a single data structure that identifies a number of preexisting users with string data that is similar to the string information for the unidentified user, and outputting the single data structure, wherein the different types of string data are concatenated into the single data structure for the comparison data;

executing a filter on the single data structure using a plurality of preexisting identifiers stored on the physical storage device to generate a list of candidate identifiers using the sparse data, wherein the plurality of preexisting identifiers corresponds to a plurality of preexisting users;

generating distance information from the list of candidate identifiers, the distance information comprising a string distance between strings from the string information, a location distance between physical locations identified from identifying information, and a numeric distance between digital profile values from the identifying information;

executing a plurality of ordinal machine learning models on input comprising the distance information to generate, as output, a plurality of probabilities that indicate likelihoods that the list of candidate identifiers match the identifier of the unidentified user, wherein each of the plurality of probabilities relates to one candidate identifier in the list of candidate identifiers potentially matching the identifier of the unidentified user, and wherein each candidate identifier is assigned a sub-plurality of probabilities in the plurality of probabilities;

generating a combined set of probabilities that the identifier matches the list of candidate identifiers, wherein each probability in the combined set of probabilities is a combination of each sub-plurality of probabilities, and wherein, in the combined set of probabilities, each probability is assigned to a single candidate identifier in the list of candidate identifiers;

selecting, by inputting the distance information, the combined set of probabilities, and the list of candidate identifiers to a selector, a core identifier by determining a match between the identifier and a selected candidate identifier in the list of candidate identifiers;

matching the core identifier to the identifier using the match to identify the unidentified user as the matched preexisting user from the plurality of preexisting users; and processing the registration request by linking the preexisting online account to the second online account or by directing the registration request to the preexisting online account.

2. The method of claim 1, further comprising:

presenting account information corresponding to the core identifier in response to the request.

3. The method of claim 1, further comprising:

selecting the core identifier by:

identifying the selected candidate identifier, from the list of candidate identifiers, as the core identifier when a selected probability from a set of probabilities, generated from the distance information, corresponds to a first category.

4. The method of claim 1, further comprising:

selecting the core identifier by:

generating the core identifier with a group identifier from the selected candidate identifier, from the list of candidate identifiers, when a selected probability from a set of probabilities, generated from the distance information, corresponds to a second category.

5. The method of claim 1, further comprising:

selecting the core identifier by:

generating the core identifier, which is different from the candidate identifiers of the list of candidate identifiers, when a selected probability from a set of probabilities, generated from the distance information, corresponds to a third category.

6. A server for using a combination of machine learning models to identify, as a matched preexisting user, an unidentified user of a preexisting online account when the unidentified user is attempting to access a second online account using different or conflicting identifying information or devices, the server comprising:

a computer processor;

a physical storage device;

a plurality of sparse models;

a plurality of ordinal models; and an application executing on the server and configured for:

receiving a request with an identifier of the unidentified user, wherein the request is a registration request to register the second online account using the different or conflicting identifying information or devices;

generating, by a computer processor and storing on a physical storage device, sparse data from string information corresponding to the identifier of the unidentified user, wherein the string information comprises different types of string data, wherein generating the sparse data further comprises:

inputting the string information to a sparse model comprising an N-gram machine learning model, generating, by the sparse model, a sparse matrix that identifies N-grams in the string information, generating, by the sparse model, comparison data from the sparse matrix, wherein the comparison data includes a single data structure that identifies a number of preexisting users with string data that is similar to the string information for the unidentified user, and outputting the single data structure, wherein the different types of string data are concatenated into the single data structure for the comparison data;

executing a filter on the single data structure using a plurality of preexisting identifiers stored on the physical storage device to generate a list of candidate identifiers using the sparse data, wherein the plurality of preexisting identifiers corresponds to a plurality of preexisting users;

generating distance information from the list of candidate identifiers, the distance information comprising a string distance between strings from the string information, a location distance between physical locations identified from identifying information, and a numeric distance between digital profile values from the identifying information;

executing a plurality of ordinal machine learning models on input comprising the distance information to generate, as output, a plurality of probabilities that indicate likelihoods that the list of candidate identifiers match the identifier of the unidentified user, wherein each of the plurality of probabilities relates to one candidate identifier in the list of candidate identifiers potentially matching the identifier of the unidentified user, and wherein each candidate identifier is assigned a sub-plurality of probabilities in the plurality of probabilities;

generating a combined set of probabilities that the identifier matches the list of candidate identifiers, wherein each probability in the combined set of probabilities is a combination of each sub-plurality of probabilities, and wherein, in the combined set of probabilities, each probability is assigned to a single candidate identifier in the list of candidate identifiers;

selecting, by inputting the distance information, the combined set of probabilities, and the list of candidate identifiers to a selector, a core identifier by determining a match between the identifier and a selected candidate identifier in the list of candidate identifiers;

matching the core identifier to the identifier using the match to identify the unidentified user as the matched preexisting user from the plurality of preexisting users; and processing the registration request by linking the preexisting online account to the second online account or by directing the registration request to the preexisting online account.

7. The server of claim 6, wherein the application is further configured for:

presenting account information corresponding to the core identifier in response to the request.

\* \* \* \* \*